United States Patent
Hellgren et al.

(10) Patent No.: US 9,803,551 B2
(45) Date of Patent: Oct. 31, 2017

(54) METHOD FOR MANUFACTURING OF A GAS TURBINE ENGINE COMPONENT

(75) Inventors: Lars-Olof Hellgren, Trollhattan (SE); Olof Lewin, Kungalv (SE); Kent Holmedahl, Trollhattan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 685 days.

(21) Appl. No.: 14/366,769

(22) PCT Filed: Dec. 20, 2011

(86) PCT No.: PCT/SE2011/000235
§ 371 (c)(1),
(2), (4) Date: Aug. 26, 2014

(87) PCT Pub. No.: WO2013/095202
PCT Pub. Date: Jun. 27, 2013

(65) Prior Publication Data
US 2015/0007570 A1    Jan. 8, 2015

(51) Int. Cl.
*F01D 25/16* (2006.01)
*F02C 7/20* (2006.01)

(52) U.S. Cl.
CPC ............. *F02C 7/20* (2013.01); *F01D 25/162* (2013.01); *F05D 2230/232* (2013.01);
(Continued)

(58) Field of Classification Search
CPC ........ F01D 25/16; F01D 25/162; F01D 25/24; F01D 25/246
See application file for complete search history.

(56) References Cited

U.S. PATENT DOCUMENTS 5,161,947 A * 11/1992 Eckfeldt ............... F02C 7/20
415/142
5,483,792 A    1/1996 Czachor et al.
(Continued)

FOREIGN PATENT DOCUMENTS

EP    0344877 A1    12/1989
EP    1247944 A2    9/2002
(Continued)

OTHER PUBLICATIONS

Japanese Office Action for Patent Application No. JP2014-548718 dated Nov. 11, 2015 (with translation; 14 pages).
(Continued)

*Primary Examiner* — Richard Edgar
(74) *Attorney, Agent, or Firm* — Bejin Bieneman PLC

(57) ABSTRACT

The invention concerns a method for manufacturing of a gas turbine engine component (37) comprising an outer ring structure (42, 47), an inner ring structure (41), and a plurality of circumferentially spaced elements (46, 46a, 46b) extending between the inner ring structure (41) and the outer ring structure (42), wherein a primary gas channel for axial gas flow is defined between the elements (46, 46a, 46b), and wherein the component (37) has an inlet side for gas entrance and an outlet side for gas outflow. The invention is characterized in that the method comprises the step of machining a one-piece metal blank as to form a one-piece part (47) comprising: a portion (46b) of each of said elements (46), wherein said portion (46b) relates to a portion of an extension length of the elements (46) between said ring structures (41, 42); and a ring-shaped member (42) that connects said element portions (46b) and that is intended to form part of one of the ring structures. The invention also concerns a gas turbine engine (1) comprising a component (37) manufactured according to the above method.

17 Claims, 4 Drawing Sheets

(52) U.S. Cl.
CPC ...... *F05D 2230/53* (2013.01); *F05D 2230/60* (2013.01); *Y10T 29/49234* (2015.01)

(56) References Cited

U.S. PATENT DOCUMENTS

| | | | |
|---|---|---|---|
| 7,544,040 B2 * | 6/2009 | Marke | F01D 9/06 29/889.22 |
| 8,556,581 B2 * | 10/2013 | Davey | F01D 9/042 415/209.4 |
| 2004/0103534 A1 | 6/2004 | Lundgren et al. | |
| 2008/0022692 A1 | 1/2008 | Nagendra et al. | |
| 2008/0134687 A1 | 6/2008 | Kumar et al. | |
| 2009/0101787 A1 | 4/2009 | Dierberger | |
| 2011/0073745 A1 | 3/2011 | Duchatelle et al. | |

FOREIGN PATENT DOCUMENTS

| | | |
|---|---|---|
| EP | 1482130 | 9/2002 |
| EP | 1845237 | 10/2007 |
| EP | 1930555 | 6/2008 |
| EP | 2148046 | 1/2010 |
| EP | 2233697 A2 | 9/2010 |
| GB | 918692 A | 2/1963 |
| GB | 2226086 A | 6/1990 |
| GB | 2226600 A | 7/1990 |
| JP | H06-235331 A | 8/1994 |
| JP | 2011525953 A | 9/2011 |
| WO | 2004016911 A1 | 2/2004 |
| WO | 2005012696 A1 | 2/2005 |
| WO | 2005116405 A1 | 12/2005 |
| WO | 2010123413 A1 | 10/2010 |

OTHER PUBLICATIONS

PCT International Search Report and Written Opinion (PCT/SE2011/000235) dated Aug. 30, 2012 (10 pages).
Extended European Search Report for EP11877904.0 dated Sep. 23, 2015 (6 pages).

* cited by examiner

METHOD FOR MANUFACTURING OF A GAS TURBINE ENGINE COMPONENT

CROSS-REFERENCE TO RELATED APPLICATION

This application claims priority to, and is a National Phase of, International Application No. PCT/SE2011/000235, filed on Dec. 20, 2011, which is hereby incorporated by reference in its entirety.

TECHNICAL FIELD

This disclosure relates to a method for manufacturing of a gas turbine engine component, e.g., a method involving assembling of pre-fabricated parts. The disclosure also relates to a gas turbine engine comprising such a component.

BACKGROUND

An axial gas turbine engine, such as an aircraft "jet-engine," generally comprises an air inlet, a compressor section, a fuel combustion chamber, a turbine section, one or several rotatable drive shafts connecting corresponding compressors and turbines, an exhaust outlet, and structures for supporting the drive shafts and for mounting the engine to, e.g., an aircraft.

Typically, the supporting structures are static parts that include an inner shell or ring, for connection to bearings and a centrally located drive shaft, and an outer shell or ring, for connection to, e.g., an engine casing, and where circumferentially distributed struts extend between and connect the inner and outer shells/rings. The supporting structures are designed to be capable of transferring loads between the drive shaft and the engine casing. An axial gas flow through the engine is allowed to flow between the struts which normally are aerodynamically designed. Supporting structures of the type discussed here are exposed to rather extreme balance loads and thermally generated loads.

Traditionally, supporting structures have been manufactured as one large casted component. To reduce costs, it has over the recent years become more common to manufacture supporting structures by assembling of prefabricated parts, such as smaller casted, forged and sheet metal parts. Typically, the parts are welded together. A problem related to this technique is the heat induced into the component during the welding process. This heat leads to distortions in the final product and a non-exact geometry of individual parts. As a result, time must be spent on measurements and manual adjustments. Therefore, assembling of prefabricated parts is often difficult to automate in an efficient way.

There is a need for methods of manufacturing supporting structures of the above type that both are cost-effective and allow for efficient automation.

SUMMARY

A method for manufacturing of a gas turbine engine component involves assembling of pre-fabricated parts but still is cost-effective and suitable for automation.

The method may be for manufacturing a gas turbine engine component comprising an outer ring structure, an inner ring structure, and a plurality of circumferentially spaced elements extending between the inner ring structure and the outer ring structure, wherein a primary gas channel for axial gas flow is defined between the elements, and wherein the component has an inlet side for gas entrance and an outlet side for gas outflow.

The method comprises the step of machining a one-piece metal blank as to form a one-piece part comprising: a portion of each of the elements, wherein the portion relates to a portion of an extension length of the elements between the ring structures; and a ring-shaped member that connects the element portions and that is intended to form part of one of the ring structures.

By selecting a suitable material and shape of the metal blank, machining of a one-piece part of the above type can be made more cost-effective than casting of such a part. Further, machining, for example, milling, provides for reaching sufficiently low tolerances. Moreover, because the one-piece part contains a portion of the length of each of the elements (struts) it is not necessary to join any end parts of the struts at/to the outer or inner ring structures. This is an advantage since welded T-joints between a strut and a ring member has a tendency to lead to crack formation and limited durability of the component. Instead, butt-joints can be used to connect corresponding strut portions at some point along the length of each vane, for instance at a point in the middle between the outer and inner ring structures. These corresponding strut portions provide for the remaining portion of the struts and may be attached or attachable to a corresponding ring-member so that welded T-joints of struts can be avoided on both ring structures. Since the butt-joints of the strut portions extend substantially in the direction of the gas flow there is no need for machining after welding such a joint.

In an embodiment, the ring-shaped member is intended to form part of the outer ring structure, wherein the element portions extend inwards from an inner side of the ring-shaped member. In line with traditional assembling technique such a component could be produced by welding together a number of element portions with a corresponding number of curved plates that separate the element portions. However, this requires a lot of welding joints and considerable amounts of heat are induced into the material during assembling which can give rise to the before-mentioned problems. By instead machining this part out of a one-piece metal blank the welding is dispensed with and accurate measures of the part can be achieved. In addition, the cost of casting is avoided.

In an embodiment, the one-piece part comprises a plurality of element extensions that extend radially outwards from an outer side of the ring-shaped member, wherein each element extension is arranged in a position opposite to that of a corresponding element portion such that loads can be transferred substantially straight radially through the ring-shaped member between the element portions and the corresponding element extensions. This way the main loads from and/or to the elements (struts) in the final component can be transferred via a further part positioned radially outwards of the ring-shaped member, which further part may be particularly designed for this purpose. Thus, the ring-shaped member connecting the strut portions does not have to carry any substantial load and can therefore be designed only for connecting the struts and for guiding the gas flow. This makes it possible to make the ring-shaped member very thin.

In an embodiment, the one-piece metal blank is a forged ring. This provides for an efficient method. The material may be a martensitic precipitation-hardenable stainless steel.

In an embodiment, the method comprises the steps of producing the outer and inner ring structures as to form separate structures and joining the inner and outer ring structures together via the elements. The method may comprise the step of welding said element portions to corresponding remaining element portions for connection to the other ring structure.

In an embodiment of the disclosure the corresponding remaining element portions form part of another ring-shaped member. This way only one welding is necessary for connecting the two ring-shaped members via the elements.

The disclosure also relates to a gas turbine engine comprising a component manufactured according to the above method. In a further embodiment of the disclosure, the gas turbine is arranged for propulsion of an aircraft.

BRIEF DESCRIPTION OF DRAWINGS

In the description given below reference is made to the following figure, in which.

DESCRIPTION OF EXAMPLE EMBODIMENTS

Figure 1:
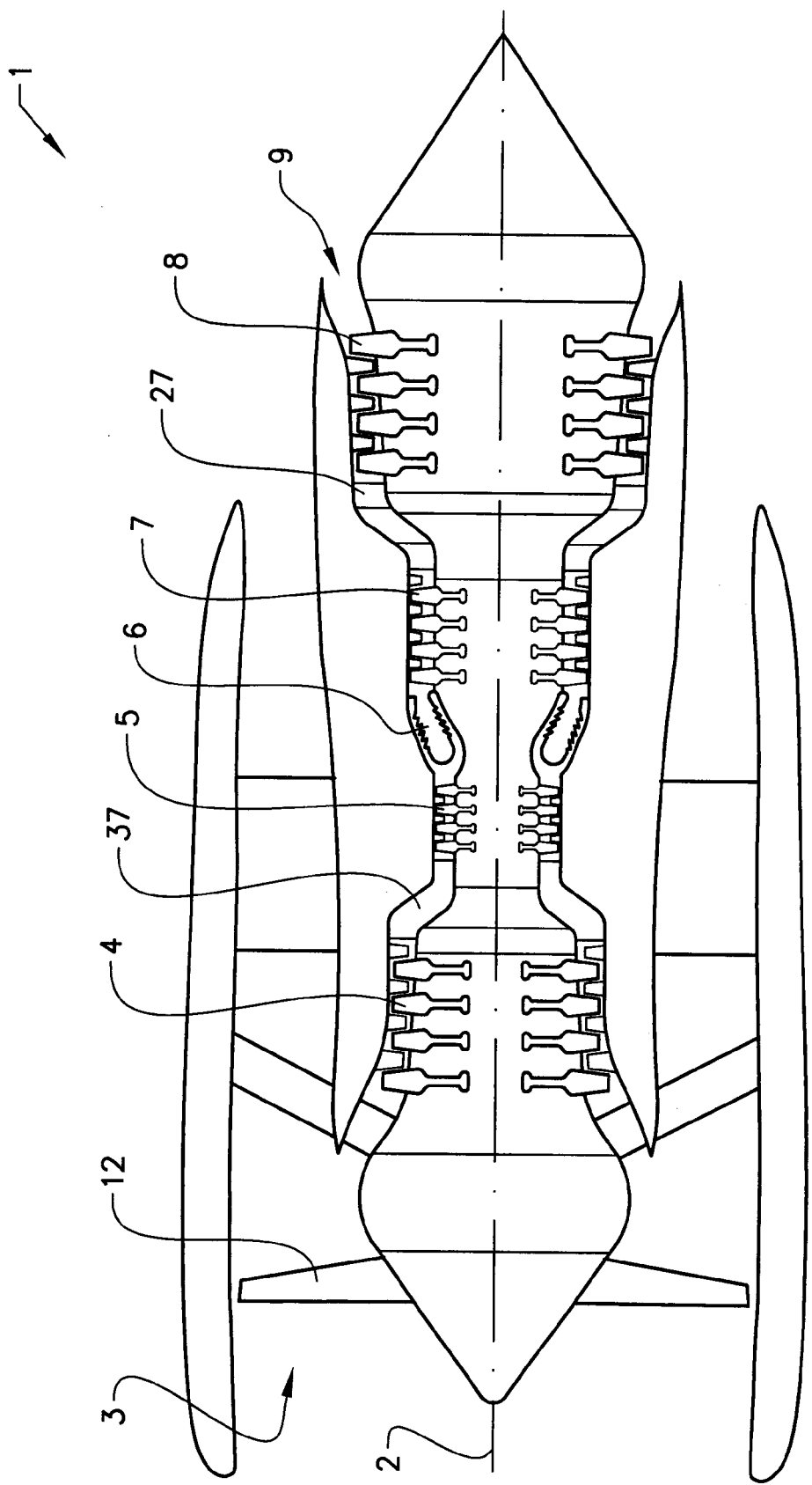
FIG. 1 shows, in a schematic overview, an axial flow aircraft gas turbine engine provided with a gas turbine engine component manufactured according to the disclosed method.

FIG. 1 shows, in a schematic overview, an axial flow aircraft gas turbine engine 1 provided with a supporting structure 37. FIG. 1 also shows a further supporting structure 27. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8, and an exhaust outlet 9. During operation, the high pressure compressor 5 is driven by the high pressure turbine 7 via a first hollow shaft, the high pressure (HP) turbine shaft (not shown). Similarly, the low pressure compressor 4 is driven by the low pressure turbine 8 via a second hollow shaft, the low pressure (LP) turbine shaft (not shown), which is coaxially disposed within the first turbine shaft 10. A third coaxially arranged shaft (not shown) is connected to a fan 12 that forces air into and around the gas turbine engine casing. A common axis 2 is also shown.

The gas turbine engine 1 operates, in general, in a conventional manner whereby air drawn in through the air intake 3 is initially compressed by the fan 12 and then compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The engine 1 further comprises a rear supporting structure 27 and a front supporting structure 37 for supporting the drive shafts and for mounting the engine to an aircraft. The front supporting structure is arranged between the low and high pressure compressors 4, 5 and forms what is commonly referred to as an intermediate compressor case, ICC. The rear supporting structure 27 is commonly referred to as a Turbine Rear Frame (TRF), Turbine Exhaust Case or Tail Bearing Housing.

Generally, support structures in jet engines support one or several shafts using roller bearings. The load is transmitted through an inner support structure (support cone) to an inner hub connected to an outer structure (shroud) via radial "spokes." In order to reduce aerodynamic drag or to guide the gas flow these "spokes" are usually covered with an airfoil structure or made integral to the structure. Integrated airfoils or vanes are often denoted "struts." Struts are capable of supporting both aerodynamic loads as well as a combination of structural and thermal induced loads. Most of the modern jet engines utilize such struts in ring-strut-ring components, such as the front supporting structure 37.

Figure 2:
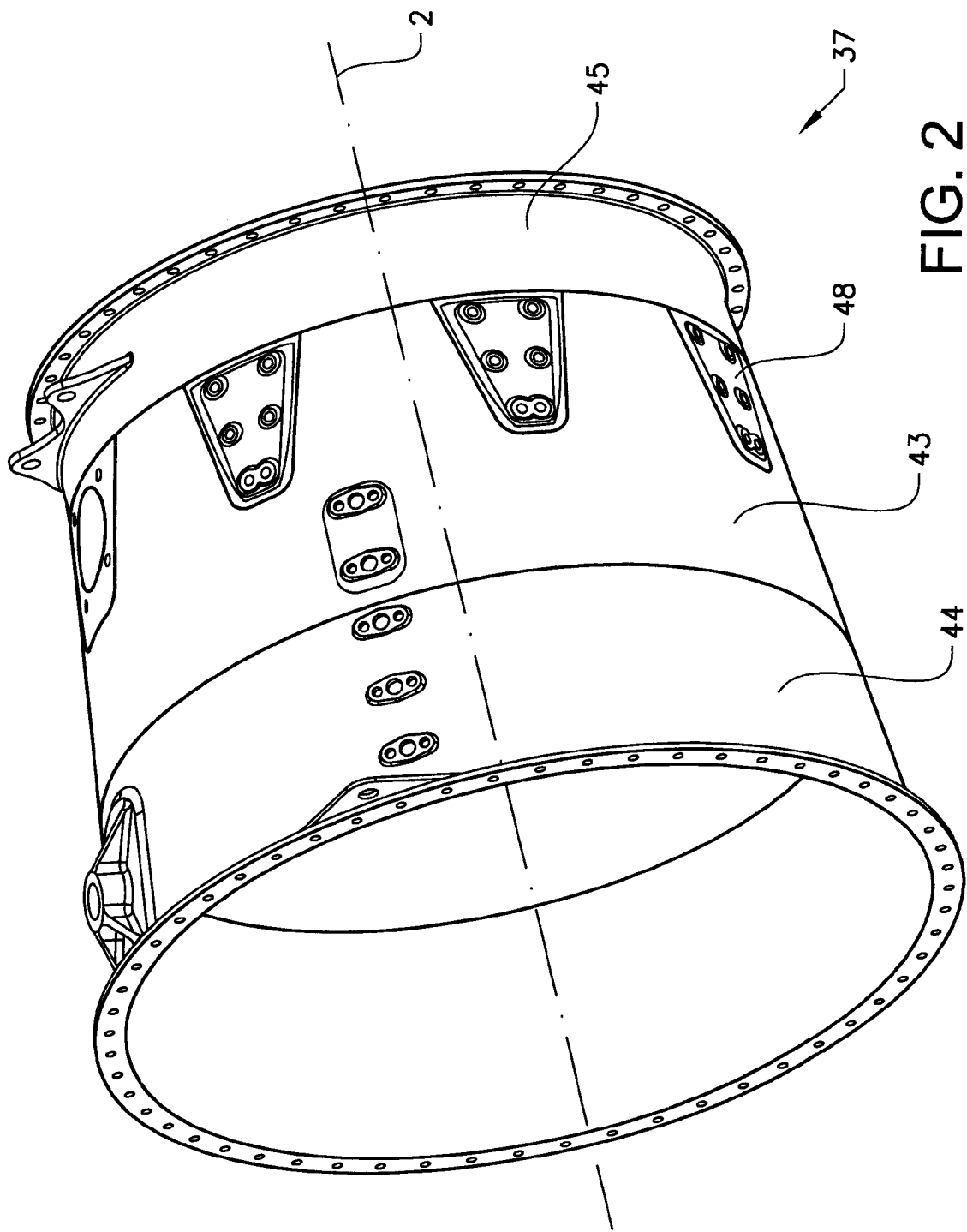
FIG. 2 shows, in a perspective view, an embodiment of the inventive gas turbine engine component manufactured according to the disclosed method.
Figure 3:
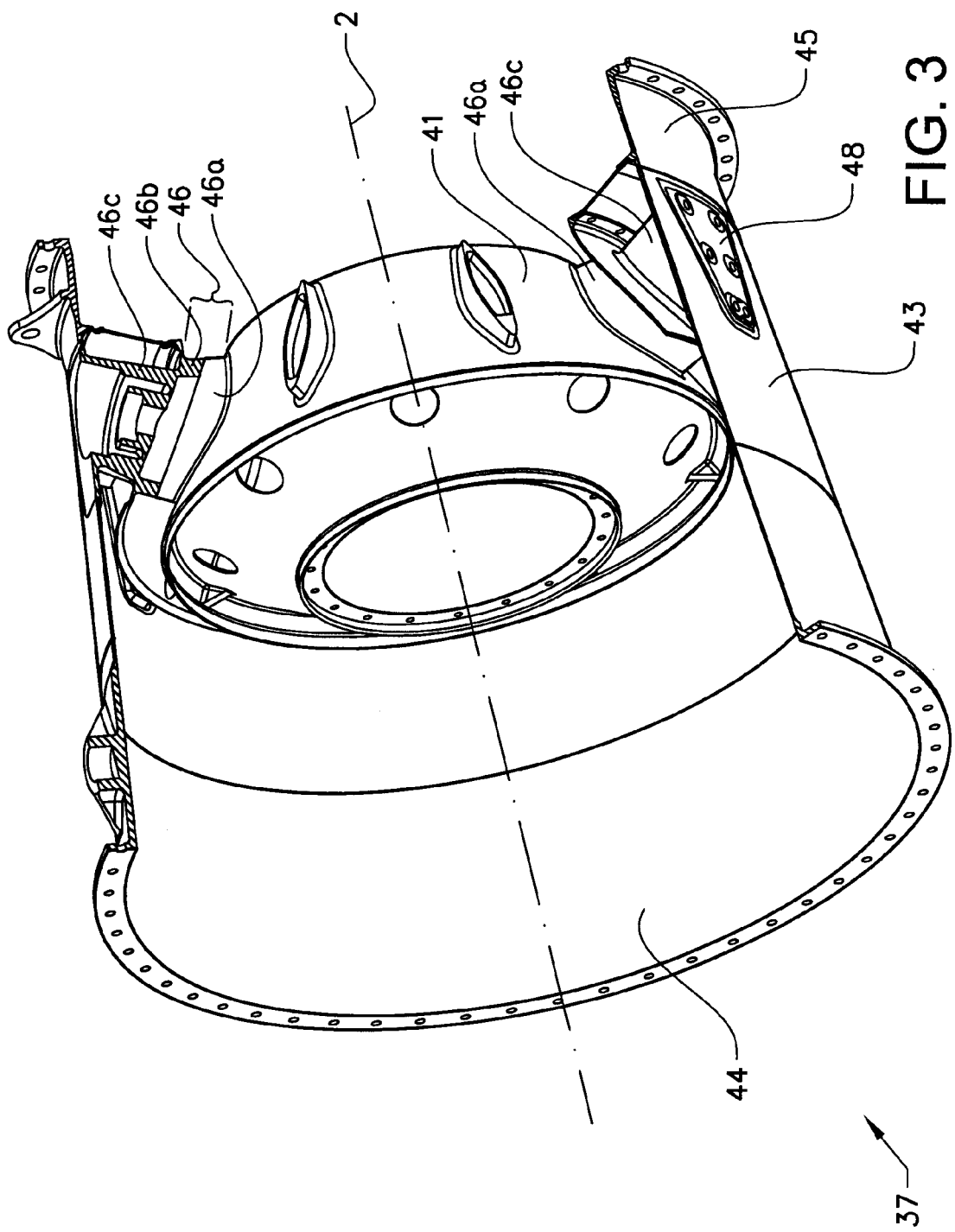
FIG. 3 shows a partial sectional view of the component according to FIG. 2.
Figure 4:
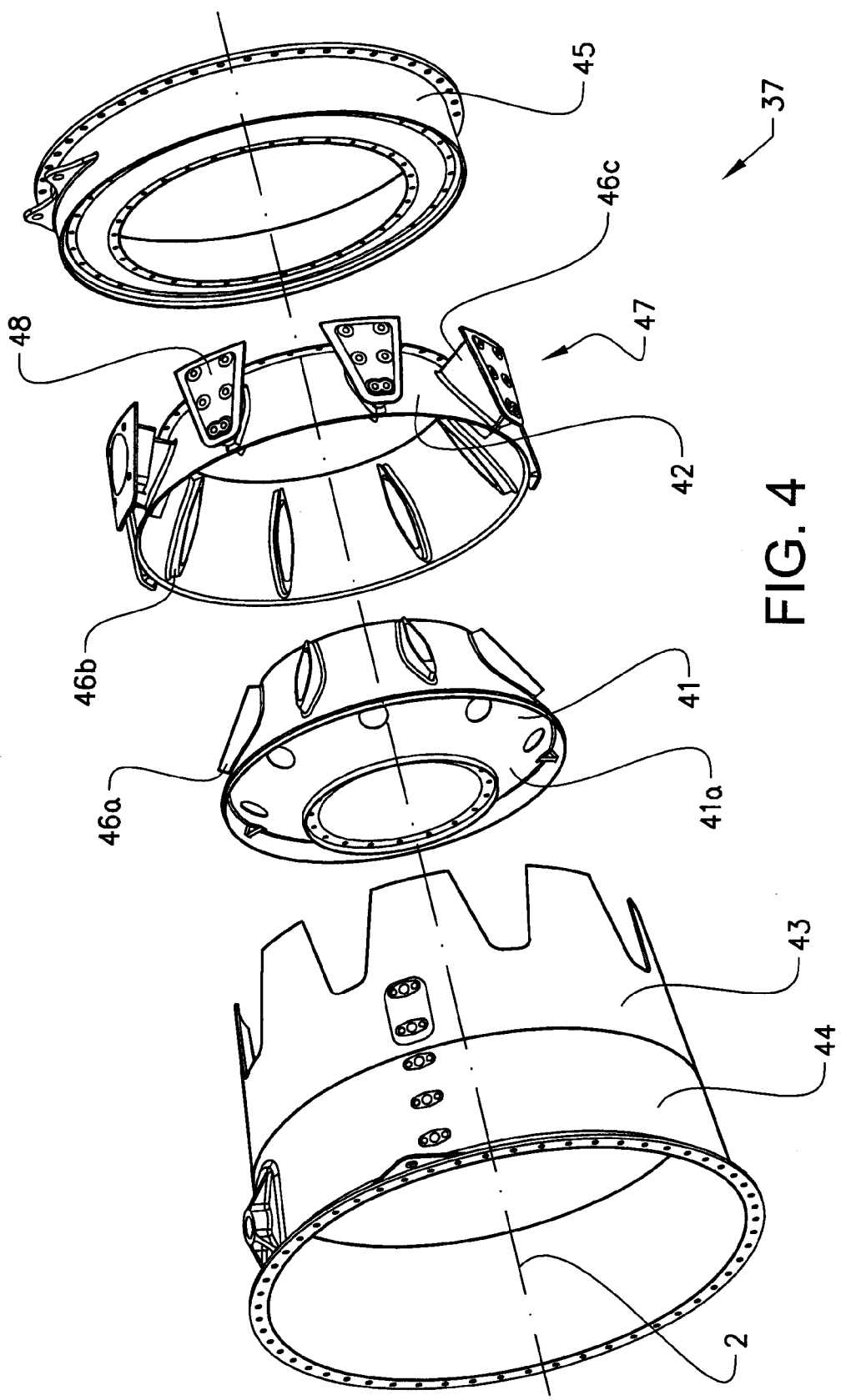
FIG. 4 shows the component according to FIG. 2 in an exploded perspective view.

FIG. 2 shows the component 37 in an assembled state, FIG. 3 shows a partial sectional view of the assembled component 37 and FIG. 4 shows an exploded view of the component 37. FIG. 4 thus shows prefabricated parts that form the component 37 when joined together.

As shown in FIGS. 2-4 an embodiment of the gas turbine engine component 37 manufactured according to the method comprises an inner ring structure in the form of a hub 41 and an outer ring structure essentially formed by an annular one-piece part 47 (a "Ring-of-Vanes") that comprises a ring-shaped member 42. The hub 41 comprises at an inside thereof an annular supporting structure 41a for connection to a shaft bearing seat. The outer ring structure is intended to be connected to a supporting part of the engine casing. The exemplified component further comprises a front case 43, a front flange 44 and a rear case 45. The inner and outer ring structures are concentrically arranged around the common axis 2.

A plurality of circumferentially spaced elements in the form of struts 46 (formed by portions 46a, 46b as further described below) extend radially between the hub 41 and the ring-shaped member 42, wherein a primary gas channel for axial gas flow is defined between the struts 46 (and between the inner and outer ring structure). Thus, the struts 46 are firmly connected to each one of the hub 41 and the ring-shaped member 42. The struts 46 extend in a radial direction of the component. The left side of the component 37 in the figures forms an inlet side for gas entrance and the right side forms an outlet side for gas outflow.

In this example the hub 41 is casted, whereas the part 47 including the ring-shaped member 42 is machined out of a one-piece metal blank as further described below. The front case 43, front flange 44 and rear case 45 are produced in a known manner. All these main parts are welded together as to form the component 37.

The method comprises the step of machining a one-piece metal blank as to form the one-piece part 47 comprising a portion 46b of each of said struts 46. This portion 46b relates to a portion of an extension length of the struts 46 between the ring structures, i.e. the portion 46b relates to a part of the radial length (and of the gas channel defining length) of the struts 46. The machined one-piece part 47 further comprises the ring-shaped member 42 that connects the strut portions 46b and that forms part of one of the ring structures, in this case the outer ring structure. As the ring-shaped member 42 in this case is intended to form part of the outer ring structure, the strut portions 46b extend inwards from an inner side of the ring-shaped member 42.

The hub 41 comprises corresponding remaining element/strut portions 46a for connection to the other ring structure by welding to the portions 46b forming part of the one-piece ring-shaped member 42. In the embodiment described here the two strut portions 46a, 46b to be joined together have an equal radial length, i.e. the weld joining the two portions is radially positioned in the middle of the gas channel between an outer circumferential side of the hub 41 and the inner side of the ring-shaped member 42. Positioning the weld in the middle of the gas channel has the advantages that it provides more space for carrying out the welding and that the stress, tension etc. is less in this position than close to the ring structures.

The one-piece part 47 further comprises a plurality of strut extensions 46c that extend radially outwards from an outer side of the ring-shaped member 42. Each of these extensions 46c is arranged in a position opposite to that of a corresponding strut portion 46b such that loads can be transferred substantially straight radially through the ring-shaped member 42 between the strut portions 46b and the corresponding strut extensions 46c.

A plate member 48 is arranged at the outer end of the strut extensions 46c for fastening of the component 37 to an outer support. The plate members 48 fit into cut-outs in the front case 43.

The one-piece blank used for machining the one-piece part 47 is a forged ring made of high-strength stainless steel. Examples of suitable materials are martensitic precipitation-hardenable stainless steels, such as 17-4PH and Custom 465. The work-piece may be hardened after machining by, e.g., heat treatment. A person skilled in the art is aware of the principles of which materials are suitable and how to treat and/or harden these materials.

Machining, such as milling, of such materials is also known as such to the skilled person. It may be mentioned that the weight of the forged ring blank may be 300 kg, whereas the weight of the one-piece part 47 may be 12 kg.

Because the method is suitable for automation and because it is possible to make use of a material that is relatively cheap (and because the removed material can be melted and re-used), a component manufactured according to the method can be less costly than a conventional, casted component.

The method comprises the steps of producing the outer and inner ring structures as to form separate structures and joining the inner and outer ring structures together via the elements/struts 46. Thus, the method is a so-called fabrication method where different prefabricated parts are joined together as to form the final component. In this embodiment the method further comprises the specific step of welding the outer strut portions 46b to the corresponding remaining inner strut portions 46a for connection of the two ring structures.

In this particular example the radial height of the gas flow channel between the inner and outer ring structures, i.e., the distance between the hub 41 and the ring-shaped member 42, may be only 45 mm. This means that it is not very much space for welding but by using strut portions 46a, 46b of equal radial length and thereby placing the weld in the middle of the gas channel there is still room for carrying out the welding. Since the strut portions 46a, 46b already form part of the ring structures only one weld per strut is 46 is needed.

The disclosure is not limited by the embodiments described above but can be modified in various ways within the scope of the claims. For instance, as an alternative or complement, the one-piece part machined out of the one-piece metal blank can form part of the inner ring structure. Thus the hub part 41 can form a machined ring-shaped member with strut portions instead of, or as a complement to, the outer machined ring-shaped member 42 as described above.

Moreover, the component 37 may comprise further struts in addition to those joined together according to the method. Also, the inner and outer ring structures can contain further components.

Further, it is not necessary to use strut portions 46a, 46b of exactly equal radial length and thereby placing the weld exactly in the middle of the gas channel. Each strut portion 46a, 46b may contribute to at least 30-40% of the radial length so that the joining weld becomes placed at least relatively close to the middle of the gas channel. Accordingly, the element portions 46b may contribute to at least 30-40%, and at the most 60-70%, of the extension length of the elements 46 between said ring structures 41, 42.

Further, the disclosure is not limited to the ICC 37 exemplified above. It is also applicable to other supporting structures in a gas turbine engine such as a front frame (inlet frame or fan hub frame), an intermediate case (IMC), a turbine mid structure (TMF, TMS) or a turbine rear frame (TRF). However, the temperature in the turbine part of the engine may be too high for using easily machinable materials.

Further, the disclosure is applicable to stationary gas turbines (power generators) as well as to flying jet engines.

The invention claimed is:

1. A method for manufacturing of a gas turbine engine component comprising an outer ring structure, an inner ring structure, and a plurality of circumferentially spaced elements extending between the inner ring structure and the outer ring structure, wherein a primary gas channel for axial gas flow is defined between the elements, and wherein the component has an inlet side for gas entrance and an outlet side for gas outflow, the method comprising:
    machining a one-piece metal blank as to form a one-piece part comprising:
        a portion of each of said elements, wherein said portion relates to a portion of an extension length of the elements between said inner ring structure and said outer ring structure; and
        a ring-shaped member that connects said element portions and that forms part of one of the inner ring structure and the outer ring structure;
    wherein the element portions contribute to at least 30-40%, and at the most 60-70%, of the extension length of the elements between said ring structures.

2. A method according to claim 1, wherein the ring-shaped member forms part of the outer ring structure, and wherein the element portions extend inwards from an inner side of the ring-shaped member.

3. A method according to claim 2, wherein the one-piece part comprises a plurality of element extensions that extend radially outwards from an outer side of the ring-shaped member, and wherein each element extension is arranged in a position opposite to that of a corresponding element portion such that loads are transferred substantially straight radially through the ring-shaped member between the element portions and the corresponding element extensions.

4. A method according to claim 1, wherein the one-piece metal blank is a forged ring.

5. A method according to claim 1, further comprising producing the outer and inner ring structures as to form separate structures and joining the inner and outer ring structures together via the elements.

6. A method according to claim 5, further comprising welding said element portions to corresponding remaining element portions for connection to the other ring structure.

7. A method according to claim 6, wherein said corresponding remaining element portions form part of another ring-shaped member.

8. A component of a gas turbine engine, the component comprising:
- an outer ring structure;
- an inner ring structure;
- a plurality of circumferentially spaced elements extending between the inner ring structure and the outer ring structure;
- wherein a primary gas channel for axial gas flow is defined between the elements and wherein the component has an inlet side for gas entrance and an outlet side for gas outflow; and
- a one-piece part comprising:
  - a portion of each of said elements, wherein said portion relates to a portion of an extension length of the elements between said inner ring structure and said outer ring structure; and
  - a ring-shaped member that connects said element portions and that forms part of one of the inner ring structure and the outer ring structure;
  - wherein the element portions contribute to at least 30-40%, and at the most 60-70%, of the extension length of the elements between said ring structures.

9. A component according to claim 8, wherein the gas turbine engine is arranged for propulsion of an aircraft.

10. A component according to claim 8, wherein the ring-shaped member forms part of the outer ring structure, and wherein the element portions extend inwards from an inner side of the ring-shaped member.

11. A component according to claim 10, wherein the one-piece part comprises a plurality of element extensions that extend radially outwards from an outer side of the ring-shaped member, and wherein each element extension is arranged in a position opposite to that of a corresponding element portion such that loads are transferred substantially straight radially through the ring-shaped member between the element portions and the corresponding element extensions.

12. A component according to claim 8, wherein the one-piece part is formed from a one-piece metal blank that is a forged ring.

13. A component according to claim 8, wherein the outer ring structure and the inner ring structures are joined together via the elements.

14. A component according to claim 13, wherein said element portions are welded to corresponding remaining element portions for connection to the other ring structure.

15. A component according to claim 14, wherein said corresponding remaining element portions form part of another ring-shaped member.

16. A gas turbine engine comprising:
- a component including an outer ring structure, an inner ring structure, and a plurality of circumferentially spaced elements extending between the inner ring structure and the outer ring structure, wherein a primary gas channel for axial gas flow is defined between the elements, and wherein the component has an inlet side for gas entrance and an outlet side for gas outflow;
- wherein the component is formed from a method comprising:
- machining a one-piece metal blank as to form a one-piece part comprising:
  - a portion of each of said elements, wherein said portion relates to a portion of an extension length of the elements between said inner ring structure and said outer ring structure; and
  - a ring-shaped member that connects said element portions and that forms part of one of the inner ring structure and the outer ring structure;
  - wherein the element portions contribute to at least 30%, and at the most 70%, of the extension length of the elements between said ring structures.

17. A gas turbine engine according to claim 16, wherein the gas turbine engine is arranged for propulsion of an aircraft.

* * * * *